US008112518B2

(12) United States Patent
Underhill (10) Patent No.: US 8,112,518 B2
(45) Date of Patent: Feb. 7, 2012

(54) REDUNDANT SYSTEMS MANAGEMENT FRAMEWORKS FOR NETWORK ENVIRONMENTS

(75) Inventor: William Roy Underhill, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 539 days.

(21) Appl. No.: 12/242,796

(22) Filed: Sep. 30, 2008

(65) Prior Publication Data

US 2009/0164565 A1     Jun. 25, 2009

(30) Foreign Application Priority Data

Dec. 21, 2007 (CA) .................................. 2616229

(51) Int. Cl.
*G06F 15/173* (2006.01)
(52) U.S. Cl. ......... 709/224; 709/223; 709/225; 709/226
(58) Field of Classification Search ........... 709/223–226
See application file for complete search history.

(56) References Cited

U.S. PATENT DOCUMENTS

| | | | |
|---|---|---|---|
| 5,655,081 A | | 8/1997 | Bonnell et al. |
| 6,014,686 A * | | 1/2000 | Elnozahy et al. ............. 709/202 |
| 6,996,502 B2 * | | 2/2006 | De La Cruz et al. .......... 702/188 |
| 7,130,909 B2 * | | 10/2006 | Yamashita et al. ............ 709/226 |
| 7,779,109 B2 * | | 8/2010 | Carlson et al. ................ 709/223 |
| 2004/0010586 A1 | | 1/2004 | Burton et al. |
| 2004/0010716 A1 * | | 1/2004 | Childress et al. ............. 713/201 |
| 2004/0049572 A1 * | | 3/2004 | Yamamoto et al. ........... 709/224 |
| 2007/0180077 A1 * | | 8/2007 | Letca et al. ................... 709/223 |

OTHER PUBLICATIONS

Abeck, Sebastian, et al., "A Management Architecture for Multi-Agent Systems," Institute of Telematics, University of Karlsruhe, Germany; ISBN 0-8186-8476; pp. 133-138, IEEE Computer Society, 1998.
Kleinmann, Karl, et al., "Scalability Aspects of Agent-based Naming Services;" KIMAS 2005, Apr. 18-21; pp. 91-96; ISBN 0-7803-9016.
Steenekamp, et al., "Implementation of Distributed Systems Management Policies: A Framework for the Application of Intelligent Agent Technology;" Proceedings of the IEEE Second International Workshop on Systems Management, IEEE Computer Society Press, 1996; pp. 127-135; ISBN 0-8186-7442;3; IEEE Computer Society, 2005.

(Continued)

*Primary Examiner* — Firmin Backer
*Assistant Examiner* — Brian P Whipple
(74) *Attorney, Agent, or Firm* — Schmeiser, Olsen & Watts; John Pivnichny (57) ABSTRACT

A redundant systems management framework and method for managing a target system includes an active agent configured to receive instructions from an active central server to perform management tasks on the target system and a plurality of meta-agents provided on the target system. Each meta-agent is an endpoint on the target system and is configured to monitor a corresponding central server, and to reassign the active agent to another central server upon failure of the active central server. The central servers may also monitor each other for proper operation. Each meta-agent also is configured to monitor the active agent and to revive or restart the active agent upon detecting a failure of the active agent.

18 Claims, 4 Drawing Sheets

OTHER PUBLICATIONS

Kekasg, H. M., et al.; A Multiagent System for Distributed Systems Management; Transactions on Engineering, Computing and Technology V11; Feb. 2006; pp. 91-96; ISSN 1305-5313.

Rothermel, Kurt, et al.; A Fault-Tolerant Protocol for Providing the Exactly-Once Property of Mobile Agents; Proceedings of the IEEE Symposium on Reliable Distributed Systems, 1998, pp. 100-108; ISSN 1060-9857.

Younh, T.; PAAM 1996; Proceedings of the First International Conference on the Practical Application of Intelligent Agents and Multi-Agent Technology, 1996, pp. 743-753.

Gavalas, Damianos, et al.; Mobile Software Agents for Decentralized Network and Systems Management; Microprocessors and Microsystems, v. 25, n, 2, Apr. 20, 2001, pp. 101-109; ISSN 0141-9331; Elsevier Science BV.

\* cited by examiner

FIG. 4 form management tasks on the target system and a plurality of meta-agents provided on the target system. Each meta-agent is an endpoint on the target system configured to monitor a corresponding central server, and to reassign the active agent to another central server upon failure of the active central server.

REDUNDANT SYSTEMS MANAGEMENT FRAMEWORKS FOR NETWORK ENVIRONMENTS

CROSS-REFERENCE TO RELATED APPLICATIONS

This application is based upon and claims the benefit of priority under 35 USC §119(a) from Canadian Patent Application No. 2616229, filed Dec. 21, 2007, the content of which is incorporated herein in its entirety.

COPYRIGHT NOTICE

A portion of the disclosure of this patent document contains material which Is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

The present invention relates to systems management frameworks for network environments.

Heretofore, various solutions have been proposed for management of systems connected in a network environment. In some systems management infrastructures, an agent is placed on a target system to perform various management tasks with a central server instructing the agent. However, in this configuration, the agent on the target system is left as a single point of failure. As well, the network path between the target system and the central servers may sometimes be a single point of failure. If communications are lost between the agent and the instructing central server, the central server may not be aware of the loss, or may not be able to restore communication with the target system. If there is a problem with the agent, the central server may not be able to detect the problem or fix it.

SUMMARY

The present invention relates to systems management frameworks for network environments.

In one aspect, the invention provides a systems management framework for managing a target system. The systems management framework Includes an active agent configured to receive instructions from an active central server to perform management tasks on the target system and a plurality of meta-agents provided on the target system. Each meta-agent is an endpoint on the target system configured to monitor a corresponding central server, and to reassign the active agent to another central server upon failure of the active central server.

In one embodiment, each meta-agent is configured to monitor the active agent, and is further configured to revive or restart the active agent upon detecting a failure of the active agent.

In another embodiment, each meta-agent is further configured to monitor its corresponding central server, and upon detection of a failure of the active central server, to transfer the function of issuing management instructions to another central server.

In another embodiment, each central server includes at least one endpoint for monitoring the operation of a central server, each endpoint corresponding to another central server.

In another embodiment, the central servers are configured to transfer management operations from a failed central server to a newly active central server.

In another embodiment, the active agent is configured to login to and receive management instructions from the newly active central server.

In another embodiment, the systems management framework further includes a redundant redirection layer between the active agent and the central servers such that communication between the active agent and the central servers may take place over alternate paths.

In another aspect, the invention is a method for managing a target system including providing an active agent configured to receive instructions from an active central server to perform management tasks on the target system and providing a plurality of meta-agents on the target system, where each meta-agent is an endpoint on the target system configured to monitor a corresponding central server, and to reassign the active agent to another central server upon failure of the active central server.

In one embodiment, the method further includes configuring each meta-agent to monitor the active agent, and to revive or restart the active agent upon detecting a failure of the active agent.

In another embodiment, the method further includes configuring each meta-agent to monitor its corresponding central server, and upon detection of a failure of the active central server, to transfer the function of issuing management instructions to another central server.

In another embodiment, the method further includes providing at least one endpoint in each central server for monitoring the operation of the central server, each endpoint corresponding to another central server.

In another embodiment, the method further includes configuring the central servers to transfer management operations from a failed central server to a newly active central server.

In another embodiment, the method further includes configuring the active agent to log into and receive management instructions from the newly active central server.

In another embodiment, the method further includes providing a redundant redirection layer between the active agent and the central servers such that communication between the active agent and central servers may take place over alternative paths.

In another aspect, there is provided a data processor readable medium storing data processor code that when loaded into a data processing device adapts the device to perform a method for managing a target system that includes configuring an active agent to receive instructions from an active central server to perform management tasks on the target system and configuring a plurality of meta-agents on the target system. Each meta-agent is an endpoint on the target system and is configured to monitor a corresponding central server, and to reassign the active agent to another central server upon failure of the active central server.

In an embodiment, the data processor readable medium further includes code that adapts the device to configure each meta-agent to monitor the active agent, and to revive or restart the active agent upon detecting a failure of the active agent.

In another embodiment, the data processor readable medium further includes code that adapts the device to configure each meta-agent to monitor its corresponding central server, and upon detection of a failure of the active central server, to transfer the function of issuing management instructions to another central server.

In another embodiment, the data processor readable medium further includes code that adapts the device to provide at least one endpoint in each central server for monitoring the operation of the central server, each endpoint corresponding to another central server.

In another embodiment, the data processor readable medium further includes code that adapts the device to configure the central servers to transfer management operations from, a failed central server to a newly active central server.

In another embodiment, the data processor readable medium further Includes code that adapts the device to configure the active agent to log into and receive management instructions from the newly active central server.

In another embodiment, the data processor readable medium further includes code that adapts the device to provide a redundant redirection layer between the active agent and the central servers such that communication between the active agent and central servers may take place over alternative paths.

These and other aspects of the invention will become apparent from the following more particular descriptions of exemplary embodiments.

BRIEF DESCRIPTION OF THE SEVERAL VIEWS OF THE DRAWING

In the figures which illustrate exemplary embodiments of the invention.

DETAILED DESCRIPTION

As noted above, the present invention relates to a systems management framework for networked environments.

Figure 1:
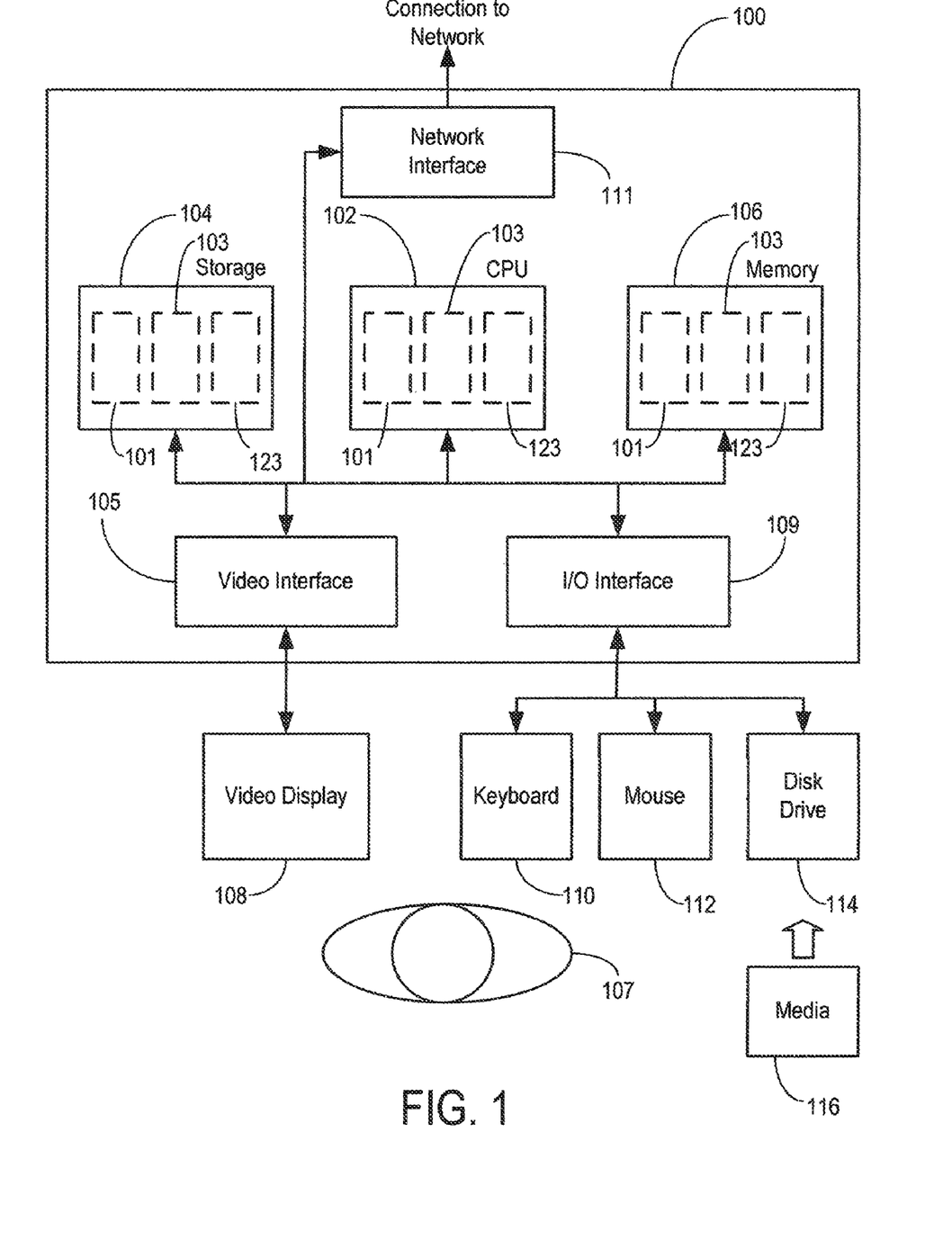
FIG. 1 shows a generic data processing system that may provide a suitable operating environment.

The invention may be practiced in various embodiments. A suitably configured data processing system, and associated communications networks, devices, software and firmware may provide a platform for enabling one or more embodiments. By way of example, FIG. 1 shows a generic data processing system 100 that may include a central processing unit ("CPU") 102 connected to a storage unit 104 and to a random access memory 106. The CPU 102 may process an operating system 101, application program 103, and data 123. The operating system 101, application program 103, and data 123 may be stored in storage unit 104 and loaded into memory 106, as may be required. An operator 107 may interact with the data processing system 100 using a video display 108 connected by a video interface 105, and various input/output devices such as a keyboard 110, mouse 112, and disk drive 114 connected by an I/O interface 109.

In known manner, the mouse 112 may be configured to control movement of a cursor in the video display 108, and to operate various graphical user interface (GUI) controls appearing in the video display 108 with a mouse button. The disk drive 114 may be configured to accept data processing system readable media 116. The data processing system 100 may form part of a network via a network interface 111, allowing the data processing system 100 to communicate with other suitably configured data processing systems (not shown). The particular configurations shown by way of example in this specification are not meant to be limiting.

As noted above, providing a single agent on a target system to perform management functions may result in a single point of failure that may lead to situations where the failure cannot be easily repaired by the systems management framework. In prior art systems, this single point of failure may have been tolerated as an acceptable risk, or the single point of failure may have been removed by providing a redundant second agent on the target system. Commonly, this second agent is configured to duplicate the function of the first agent. This approach may have some drawbacks including duplication of management functions and a doubling of the resources consumed by the redundant agents for managing a target system. In addition, there is a potential that uncoordinated or poorly coordinated redundant agents may take conflicting or duplicate management actions to correct a problem that may have unintended consequences, potentially resulting in instability.

The invention presents a novel framework for systems management involving a hierarchical arrangement of agents on a target system. The hierarchical arrangement of agents may include an active agent and a plurality of meta-agents that are configured to monitor and pass instructions to the active agent. Each of the meta-agents is associated in a one-to-one configuration with a central server and may be configured to monitor its respective central server for ongoing operation. An illustrative systems management framework in accordance with an embodiment of the invention will now be described in more detail.

Figure 2:
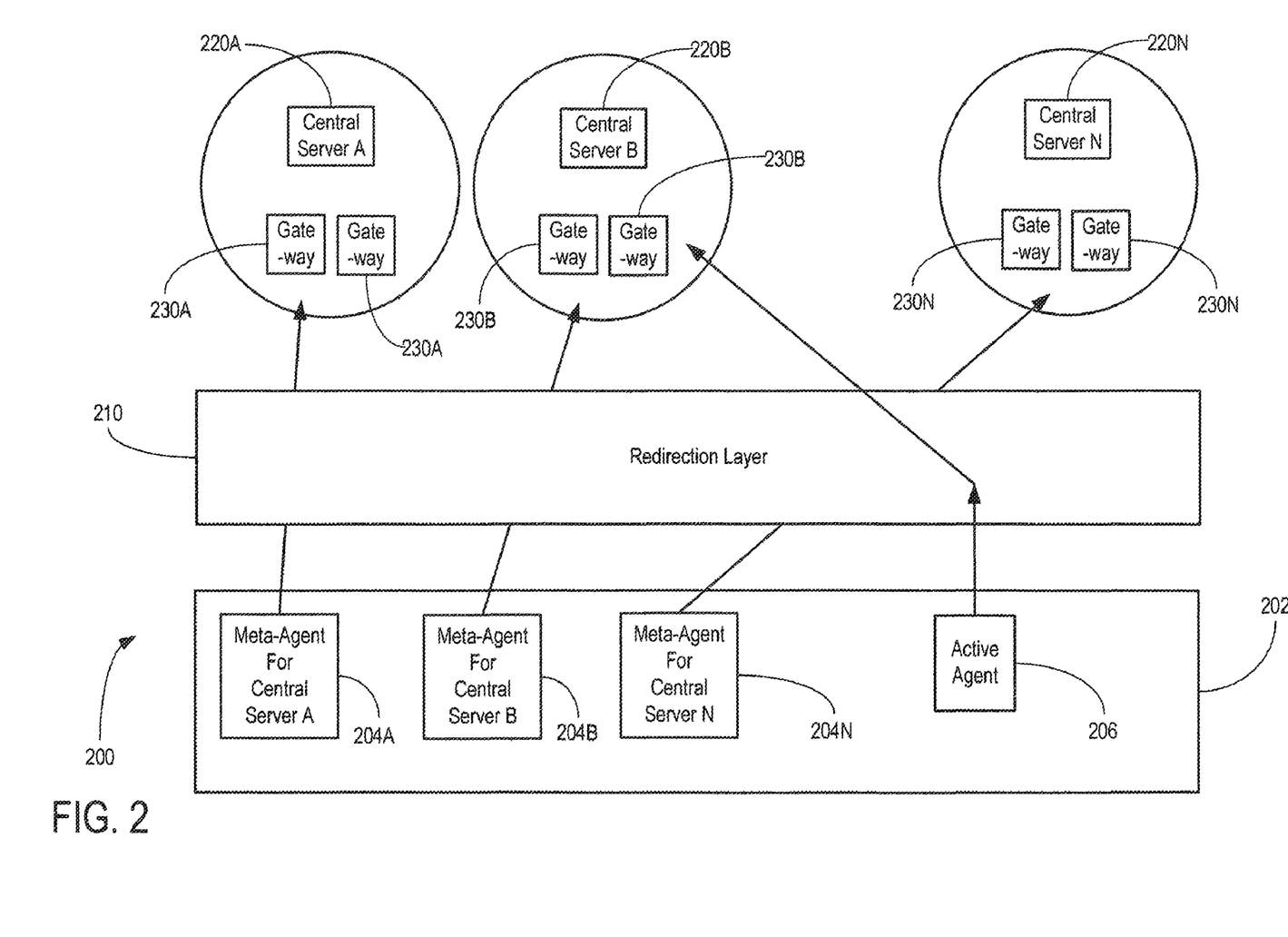
FIG. 2 shows a schematic block diagram of an illustrative topology for a systems management framework in accordance with an embodiment.

Referring to FIG. 2, shown is a schematic block diagram of an illustrative framework 200 for systems management in accordance with an embodiment of the invention. The FIG. 2 systems management framework 200 may include a target system 202 having a plurality of meta-agents 204A-204N, and an active agent 206. Active agent 206 may be connected to a redirection layer 210 configured to connect active agent 206 to a plurality of central servers 220A-220N through redundant network paths. Redirection layer 210 may be implemented in many different ways, and may employ proxies to coordinate the redirection between various alternative paths. Regardless of the particular redirection implementation employed, the purpose of the redirection layer is to make it possible for the active agent 206 to connect to the central servers 220A-220N in more than one way, either by being able to change its connection to another one of the central servers 220A-220N via their respective gateways 230A-230N, or by being able to connect over more then one network path in the redirection layer 210, or both.

In an embodiment, meta-agents 204A-204N on the target system 202 are each configured to monitor the active agent 206 to revive or restart the active agent 206. The meta-agents 204A-204N may be implemented using endpoints that correspond to the central servers 220A-220N with a one-to-one relationship. This allows each of the central servers 220A-220N to have a dedicated agent on the target system 202 for monitoring the connection to the central server 220A-220N and the active agent 206.

The active agent 206 is configured to be the only agent on the target system 202 that is capable of taking direct management action on the target system 202. All other agents (i.e. the meta-agents 204A-204N) on the target system 202 can only monitor the active agent 206, monitor the connection from the target system 202 to their respective central servers 220A-220N, and pass instructions to the active agent 206 for execution of specific tasks to change which of the central servers 220A-220N the active agent 206 is logged into.

Figure 3:
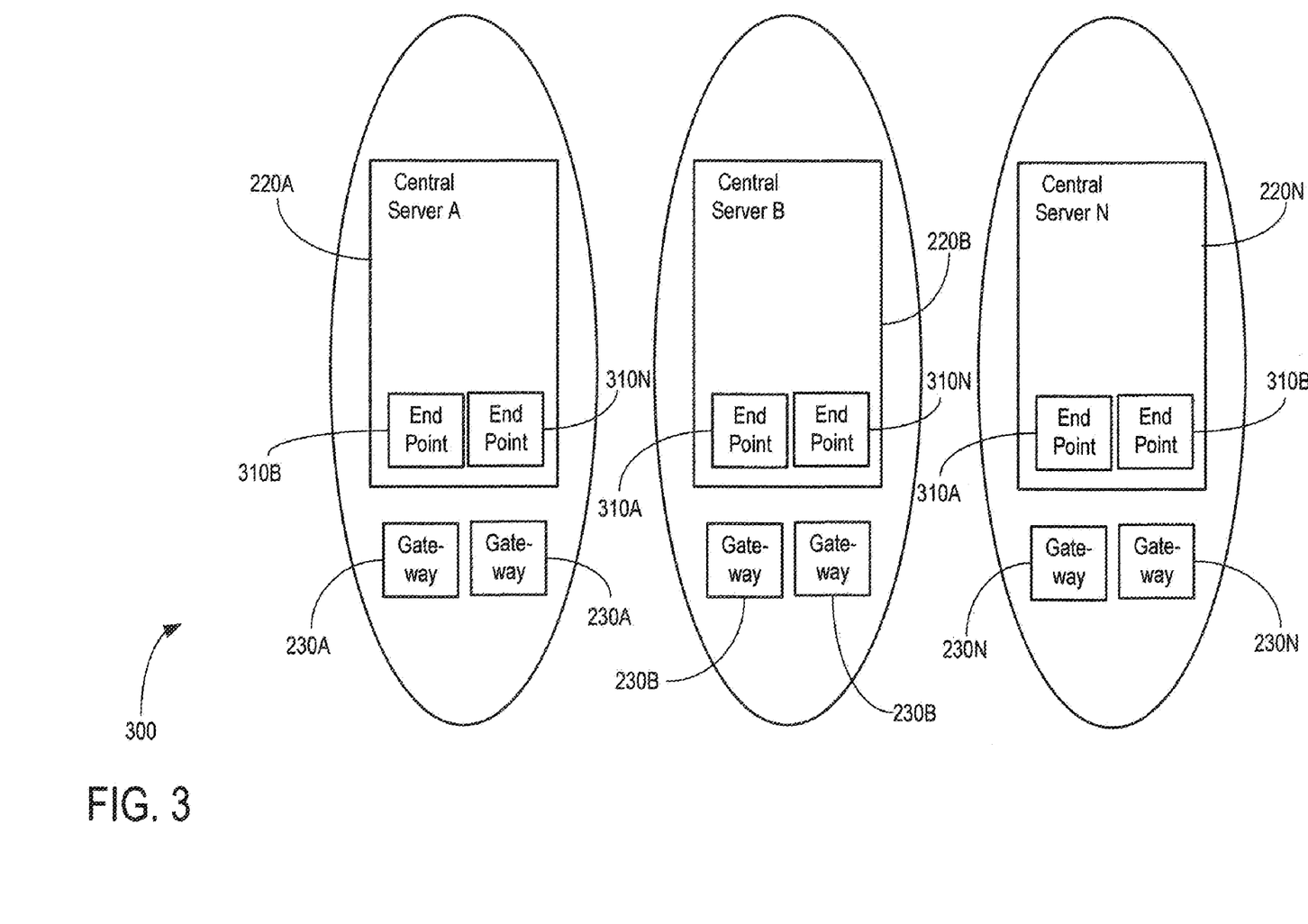
FIG. 3 shows a more detailed block diagram of a plurality of central servers in the illustrative topology in FIG. 2.

In an embodiment, the systems management framework provides redundancy at the level of the central servers 220A-220N. By way of illustration, as shown in FIG. 3, the plurality of central servers 220A-220N introduced earlier in FIG. 2 may be configured to monitor each other for proper operation. For this purpose, each central server 220A-220N may contain a sufficient number of endpoints 310A-310N to monitor every other central server 220A-220N.

In an embodiment, each central server 220A-220N may monitor every other central server 220A-220N by using a sufficient number of endpoints on each central server 220A-220N, each endpoint corresponding to another central server 220A-220N. Thus, in the illustrative example shown in FIG. 3, central server 220A includes endpoints 310B and 310N so that It can be monitored by central servers 220B and 220N; central server 220B includes endpoints 310A and 310N so that it can be monitored by central servers 220A and 220N; and central server 220N includes endpoints 310A and 310B so that it can be monitored by central servers 220A and 220B.

Alternatively, each central server 220A-220N may monitor only one or perhaps several designated central servers 220A-220N such that failure or improper operation of a central server 220A-220N will be detected by one or more monitoring central servers 220A-220N. Any change of activity to a central server 220A-220N may then be noted and suitably reflected by also changing the central server into which the active agent 206 is logged by sending appropriate instruction through the meta-agent 204A-204N that corresponds to the new active central server.

As an illustrative example, referring back to FIG. 2, assume that central server 220A has failed. Upon detection by central server 220B that the afflicted central server 220A is not operational, central server 220B may notify its meta-agent 204B on the target system 202 to reconfigure the active agent 206 to receive instructions from newly active central server 220B rather than the non-operational central server 220A. The active agent 206 remains the only agent on the target system 202 that is actively performing management, tasks.

In another embodiment, the systems management framework of the present invention also provides redundancy at the level of the active agent 206. Referring back to the illustrative example in FIG. 2, by providing a plurality of meta-agents 204A-204N to monitor the status of the active agent 206, any problems with the active agent 206 itself may be quickly detected by one or more of the meta-agents 204A-204N, and the active agent 206 may be revived or restarted as necessary to address the problem. By providing a single active agent 206 embodying a single endpoint that is capable of actively performing management tasks on the target system 202, the possibility that two or more agents may execute conflicting or duplicate management tasks on target system 202 is removed.

In the illustrative examples described above with respect to FIG. 2 and FIG. 3, the basic approach is to provide redundancy at the server level, as well as at the agent level for performing management tasks on a target system. In summary, at the agent level, a hierarchical arrangement is provided with a single endpoint, called the active agent, which performs all management tasks on the target system. Other agents, called meta-agents, monitor the active agent and the connectivity to their respective central servers, but do not directly manage the target system themselves.

In an embodiment, the meta agents on the target system may perform only limited monitoring of the central servers, and may not perform general purpose monitoring. Thus, any particular meta-agent monitors its connection to its central server only sufficiently to ascertain whether it can currently receive management instructions from its central server. Any change in the identity of the active central server thus results In a corresponding change at the meta-agents level such that the active agent continues to receive instructions from the new active central server.

As will be appreciated, the systems management framework as described above removes the single points of failure at the central server level and at the agent level, while avoiding duplication of agents performing management tasks on the target server. Redundancy may also be provided at the redirection layer to provide the necessary network availability that is required for the business purpose of the target system. Because the active agent is supported and monitored by multiple meta-agents, failure of the active agent itself brings prompt corrective action from one of the monitoring meta-agents. In addition, because there can be multiple network paths in the redirection layer, network failures will not blind the central servers or the meta-agents provided on the target system.

While there may initially be some increased effort required at implementation to install and set up the meta-agents 204A-204N, active agent 206, and associated monitoring endpoints on each of the central servers 220A-220N, the ongoing efforts required to manage the systems management framework of the present invention are thought to be not significantly greater than the effort required for prior art systems. For example, updating of agent code and maintenance of profiles may be substantially the same because there is only one active agent 206 taking management action on the target system 202. As the systems management requirements for the target system 202 change, the requirements and implementation of the active agent 202 may also change, but the requirements and the implementation of the meta-agents 204A-204N need not change.

Figure 4:
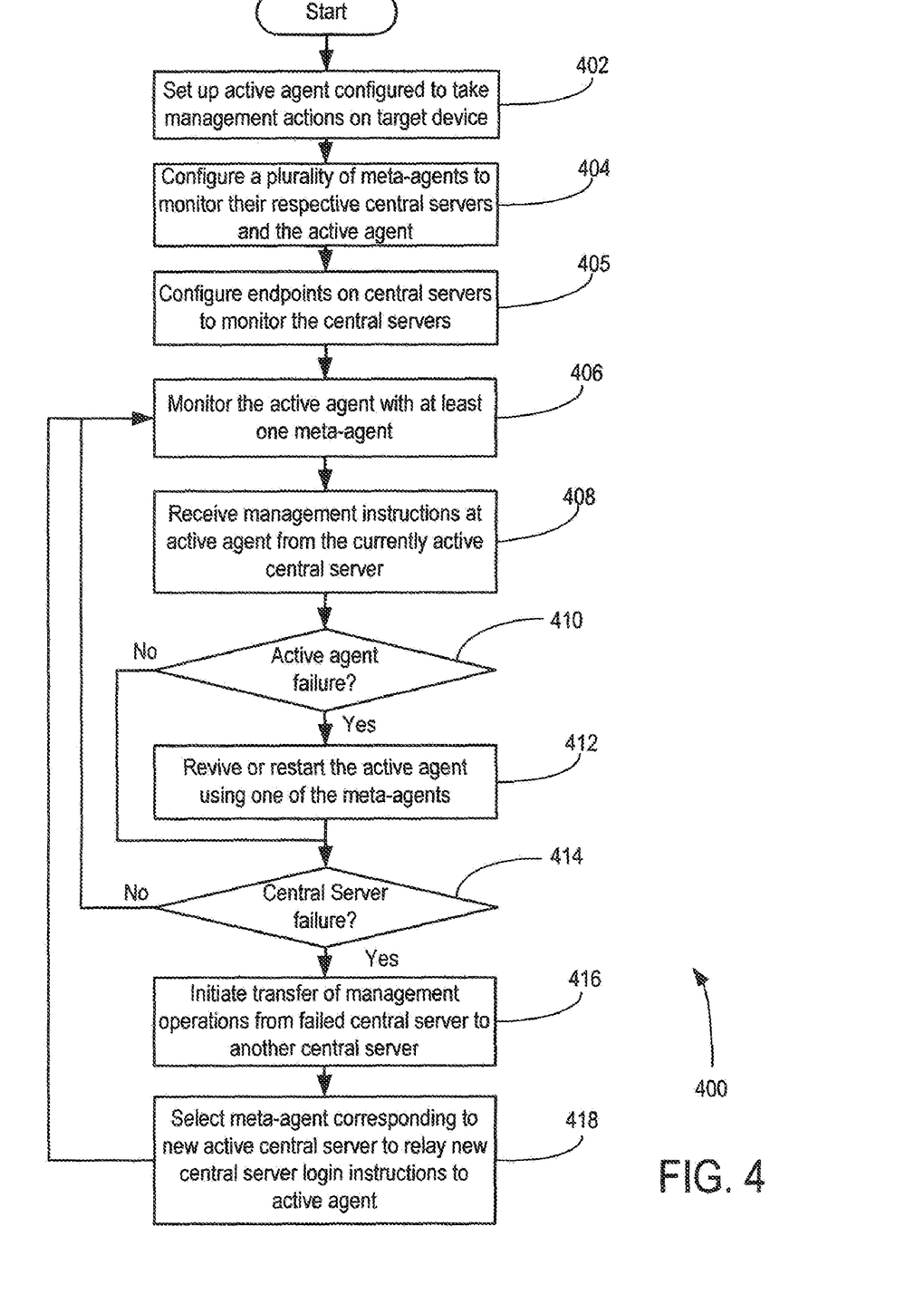
FIG. 4 shows a schematic flowchart of an illustrative method in accordance with an embodiment.

Now referring to FIG. 4, shown is a schematic flowchart 400 of an illustrative method in accordance with an embodiment. The FIG. 4 method 400 may begin, and at block 402 may set up an active agent configured to take management actions on a target device or system. Method 400 may then proceed to block 404, where method 400 may configure a plurality of meta-agents to monitor their respective central servers and the active agent.

Method 400 may then proceed to block 405, where endpoints 310A-310N on the central servers 220A-200N are configured to monitor the central servers 220A-220N.

Method 400 may then proceed to block 406, where method 400 may monitor the active agent with at least one meta-agent. Method 400 may then proceed to block 408, where method 400 may send management instructions to the active agent from the currently active central server. Method 400 may then proceed to decision block 410, where method 400 checks for any indication of a failure or improper operation of the active agent. If no, method 400 may proceed directly to decision block 414. If yes, method 400 may proceed to block 412, where method 400 may revive or restart the active agent as necessary using one of the meta-agents. Method 400 may then proceed to block 414.

At decision block 414, method 400 may try to detect any Indication of a failure or improper operation of the central server. If no, method 400 loops back to block 406 to continue. If yes, method 400 may proceed to block 416 to initiate a transfer of management operations from the failed central server to a new central server. Method 400 may then proceed to block 418, where the meta-agent corresponding to the new active central server may be selected to relay new central server login instructions to the active agent on the target device. Method 400 then loops back to block 406 to continue.

While various illustrative embodiments of the invention have been described above, it will be appreciated by those skilled in the art that variations and modifications may be made.

For example, rather than limiting the role of the meta-agents to that of relaying new central server login instructions to the active agent, the meta-agents may be configured to relay other types of information, including management instructions. In this case, the meta-agents may act as a go-between for all instructions between the active agent and the currently active central server. It will be appreciated, however, that this may require some additional overhead to operate the meta-agents.

Thus, the scope of the invention is defined by the following claims.

The invention claimed is:

1. A method for managing a target system, said method comprising:
providing a systems management framework of a data processing system, wherein the systems management framework comprises:
said target system that includes an active agent and a plurality of meta-agents,
a plurality of central servers that includes an active central server into which the active agent is logged, and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers;
said active agent receiving instructions from the active central server to perform management tasks on the target system, wherein the instructions are received by the active agent are from the active central server over a connection path through the redirection layer, and wherein said receiving instructions is implemented by a processor of the data processing system;
a first meta-agent of the plurality of meta-agents monitoring the active agent;
said first meta-agent detecting, from said monitoring the active agent, a failure of operation of the active agent; and
in response to said detecting the failure of operation of the active agent, said first meta-agent reviving or restarting the active agent.

2. A method for managing a target system, said method comprising:
providing a systems management framework of a data processing system, wherein the systems management framework comprises:
said target system that includes an active agent and a plurality of meta-agents,
a plurality of central servers that includes an active central server into which the active agent is logged, and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers;
said active agent receiving instructions from the active central server to perform management tasks on the target system, wherein the instructions are received by the active agent are from the active central server over a connection path through the redirection layer, and wherein said receiving instructions is implemented by a processor of the data processing system;
a first central server of the plurality of central servers monitoring the active central server,
said first central server detecting, from said monitoring the active central server, a failure of operation of the active central server; and
in response to said detecting the failure of the active central server, replacing the active server with a newly active central server of the plurality of central servers, wherein the active central server is a different central server than the first central server and the newly active central server.

3. The method of claim 2, wherein said replacing comprises:
said first central server directing the meta-agent corresponding to the first central server to reconfigure the active agent to receive instructions from the newly active central server to perform said management tasks on the target system; and
in response to the meta-agent corresponding to the first central server being directed to reconfigure the active agent to receive instructions from the newly active central server to perform said management tasks on the target system, said meta-agent corresponding to the first central server reconfiguring the active agent to receive instructions from the newly active central server to perform said management tasks on the target system.

4. The method of claim 2, wherein the newly active central server and the first central server are different central servers.

5. The method of claim 2, wherein the newly active central server consists of the first central server.

6. The method of claim 2, wherein the plurality of central servers comprises at least three central servers.

7. A data processing system, comprising a systems management framework, a processor, and a computer readable memory unit containing computer readable program code configured to be executed by the processor to implement a method for managing a target system via use of the systems management framework,
wherein the systems management framework comprises:
a target system that includes an active agent and a plurality of meta-agents;
a plurality of central servers that includes an active central server into which the active agent is logged; and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers, and
wherein the method comprises:
said active agent receiving instructions from the active central server to perform management tasks on the target system, wherein the instructions are received by the active agent are from the active central server over a connection path through the redirection layer;
a first meta-agent of the plurality of meta-agents monitoring the active agent;
said first meta-agent detecting, from said monitoring the active agent, a failure of operation of the active agent; and
in response to said detecting the failure of operation of the active agent, said first meta-agent reviving or restarting the active agent.

8. A data processing system, comprising a systems management framework, a processor, and a computer readable memory unit containing computer readable program code configured to be executed by the processor to implement a method for managing a target system via use of the systems management framework,
wherein the systems management framework comprises:
a target system that includes an active agent and a plurality of meta-agents;
a plurality of central servers that includes an active central server into which the active agent is logged; and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers, and wherein the method comprises:
said active agent receiving instructions from the active central server to perform management tasks on the target system, wherein the instructions are received by the active agent are from the active central server over a connection path through the redirection layer;
a first central server of the plurality of central servers monitoring the active central server;
said first central server detecting, from said monitoring the active central server, a failure of operation of the active central server; and
in response to said detecting the failure of the active central server, replacing the active server with a newly active central server of the plurality of central servers, wherein the active central server is a different central server than the first central server and the newly active central server.

9. The data processing system of claim 8, wherein said replacing comprises:
said first central server directing the meta-agent corresponding to the first central server to reconfigure the active agent to receive instructions from the newly active central server to perform said management tasks on the target system; and
in response to the meta-agent corresponding to the first central server being directed to reconfigure the active agent to receive instructions from the newly active central server to perform said management tasks on the target system, said meta-agent corresponding to the first central server reconfiguring the active agent to receive instructions from the newly active central server to perform said management tasks on the target system.

10. The data processing system of claim 8, wherein the newly active central server and the first central server are different central servers.

11. The data processing system of claim 8, wherein the newly active central server consists of the first central server.

12. The data processing system of claim 8, wherein the plurality of central servers comprises at least three central servers.

13. A tangible storage device, comprising computer readable program code configured to be executed by a processor of a data processing system to implement a method for managing a target system via use of the systems management framework,
wherein the systems management framework comprises:
a target system that includes an active agent and a plurality of meta-agents;
a plurality of central servers that includes an active central server into which the active agent is logged; and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers, and wherein the method comprises:
said active agent receiving instructions from the active central server to perform management tasks on the target system, wherein the instructions are received by the active agent are from the active central server over a connection path through the redirection layer;
a first meta-agent of the plurality of meta-agents monitoring the active agent;
said first meta-agent detecting, from said monitoring the active agent, a failure of operation of the active agent; and
in response to said detecting the failure of operation of the active agent, said first meta-agent reviving or restarting the active agent.

14. A tangible storage device, comprising computer readable program code configured to be executed by a processor of a data processing system to implement a method for managing a target system via use of the systems management framework,
wherein the systems management framework comprises:
a target system that includes an active agent and a plurality of meta-agents;
a plurality of central servers that includes an active central server into which the active agent is logged; and
a redirection layer configured to connect the active agent to the plurality of central servers, wherein each central server comprises an endpoint specific to each other central server in a one-to-one relationship for monitoring each other central server, wherein each meta-agent is configured to monitor the active agent for failure of the active agent, and wherein each meta-agent corresponds to and is connected to a unique central server of the plurality of central servers, and wherein the method comprises:
said active agent receiving instructions from the active central server to perform management tasks on the target system, wherein the instructions are received by the active agent are from the active central server over a connection path through the redirection layer;
a first central server of the plurality of central servers monitoring the active central server;
said first central server detecting, from said monitoring the active central server, a failure of operation of the active central server; and in response to said detecting the failure of the active central server, replacing the active server with a newly active central server of the plurality of central servers, wherein the active central server is a different central server than the first central server and the newly active central server.

15. The storage device of claim 14, wherein said replacing comprises:

said first central server directing the meta-agent corresponding to the first central server to reconfigure the active agent to receive instructions from the newly active central server to perform said management tasks on the target system; and in response to the meta-agent corresponding to the first central server being directed to reconfigure the active agent to receive instructions from the newly active central server to perform said management tasks on the target system, said meta-agent corresponding to the first central server reconfiguring the active agent to receive instructions from the newly active central server to perform said management tasks on the target system.

16. The storage device of claim 14, wherein the newly active central server and the first central server are different central servers.

17. The storage device of claim 14, wherein the newly active central server consists of the first central server.

18. The storage device of claim 14, wherein the plurality of central servers comprises at least three central servers.

* * * * *